Patented Dec. 6, 1938

2,138,860

UNITED STATES PATENT OFFICE 2,138,860

PROCESS FOR DISPERSING PIGMENTS

Robert Tyler Hucks, South River, N. J., assignor to E. I. du Pont de Nemours & Company, Wilmington, Del., a corporation of Delaware No Drawing. Application February 14, 1936, Serial No. 63,981

5 Claims. (Cl. 134—58)

This invention relates to an improved process for manufacturing resinous coating compositions and more particularly to a process for dispersing pigments in resin compound vehicles.

The past few years have seen the rise to prominence in the coating composition field of so-called "synthetic enamels". In general, these enamels are based on synthetic resins of which probably the most important in this field is the alkyd type of condensation product. The use of these resins for preparing coating compositions brought a large number of problems associated with the dispersion of pigments in such materials. In general, the same grinding methods used for years in the paint industry have been applied. Such methods have a number of disadvantages because of the physical and chemical composition of the resins. These resins are usually either solid or at most are viscous liquids. To handle them economically it is almost always necessary to cut them to free-flowing liquids by the addition of volatile solvents. The grinding problem is further complicated by the fact that the most useful of these resins are modified during manufacture by certain proportions of drying, semidrying or non-drying oils such as linseed, cottonseed, coconut, maize, soya and perilla oils.

The pigments utilized as coloring matter for these enamels are in the form of finely divided opaque powders, many of which are produced by chemical precipitation. Some are obtained by combustion or calcining processes, and still others are naturally occurring minerals which are ground and bolted to a suitable fineness. To accomplish the dispersion of these pigments in the synthetic resin vehicles, a buhrstone mill may be used. For this equipment the pigment-liquid medium combination must be maintained in a very fluid state, that is, a low working viscosity in order that the stone or metal discs may function properly. In this method, the dispersion is effected by a rubbing action whereby the pigment agglomerates are broken up by mechanical attrition.

Another method of dispersing pigments in the synthetic resin vehicles involves the use of a ball mill. In this case the pigment is ground in the presence of a vehicle usually comprising a plasticizer and the resin solution. Grinding is accomplished by means of pebbles or steel balls which are added to the mill in suitable proportions. In this process the viscosity of the pigment-liquid medium is also relatively low, in order to permit the balls to cascade through the medium to provide the impact and rubbing action necessary to reduce the pigment agglomerates.

These processes commonly used heretofore are largely dependent upon mechanical disintegration or attrition to break up pigment agglomerates and to remove occluded air from the pigment particles. These methods are characterized by certain deficiencies which are not conducive to manufacturing economy. The capacity of the buhr mill is distinctly limited because of the thin layers of vehicle and pigment dealt with. Moreover, a relatively large amount of hand labor is needed for its operation. The cycle of operation of the ball mill is extremely long, and the resulting dispersion of vehicle and pigment is occasionally contaminated by portions of the mill linings which have been abraded from them during the operation.

A method designed to obviate the disadvantages mentioned above consists in subjecting a relatively stiff or stiffly plastic resin in the presence of pigment to a dispersing action of the shearing type rather than to the more commonly used grinding type. This method, however, presents several difficulties among which may be mentioned the adverse effect on certain pigments, particularly on their color characteristic, of the elevated temperature required to maintain the resin in a molten condition during the kneading. Then, also, in case of resins of the drying oil type, which are particularly useful for the present purpose, there is a definite tendency to so alter the resin by oxidation and/or polymerization that the resin at the end of the kneading cycle is substantially insoluble in the customary solvents.

This invention has as an object a process for dispersing pigments in resinous vehicles which will overcome the disadvantages of the methods referred to above. A further object is the production of an intermediate pigment-synthetic resin composition in an advantageous and usable paste form from which the ultimately used composition may be made by simple mixing of the remaining ingredients. Other objects will appear as the description proceeds.

The foregoing objects are accomplished by the method hereinafter described in which pigment is kneaded with a solution of the resin in substantial quantity of solvent, and in which the consistency required to obtain dispersion through kneading action is secured by the amount of pigment used rather than by the use of a high consistency vehicle. A so-called "base" solution is formed from the resin and suitable solvents by mixing methods well known in the art. A portion of the base solution is then kneaded with the proper proportion of pigment to form a thick putty-like mass of high consistency in a kneading machine such as a Werner and Pfleiderer mixer, for a time cycle of sufficient duration to provide suitable dispersion. At the end of the kneading period an additional quantity of the resin base solution is added to facilitate removal of the charge from the machine. This intermediate product which is paste like in form and which will flow freely may then be conveniently utilized in the manufacture of commercial enamels by the addition of other ingredients such as resins, plasticizers, solvents, etc., followed by a simple mixing operation in an agitator mixer.

The following examples are illustrative of the method used in practicing my invention:

EXAMPLE I

White enamel

A resin base solution is first prepared by mixing the resin with suitable solvents in the proportions indicated as follows:

| | Per cent |
|---|---|
| Synthetic resin * | 55.0 |
| Mineral spirits | 32.1 |
| Hydrogenated naphtha (high in aromatic hydrocarbons—boiling range 135–190° C.) | 12.9 |
| | 100.0 |

*This resin is a reaction product of 15.8 parts of glycerine, 36.6 parts of phthalic anhydride, and 47.6 parts of soya bean oil. This polybasic acid-polyhydric alcohol condensation product, modified with the vegetable oil, is prepared in a closed kettle provided with a condenser and good agitation. The glycerine and vegetable oil are heated at a temperature between 195 and 235° C. until a homogeneous solution is obtained. The phthalic anhydride is then added and heating continued at about 250° C. until an acid number of about 5 to 6 is reached.

16.6 parts of the above described resin solution are placed in the kneading machine and 65.4 parts of titanium oxide are added gradually while the machine is kneading the "base" solution. A thick putty-like mass of high consistency is formed, and this mixture is kneaded for approximately three hours. At the end of the kneading cycle an additional quantity of 18.0 parts of the resin solution is added to facilitate removal of the charge from the machine.

This intermediate product, which is distinguished by its relatively free flowing characteristics, is then utilized in the manufacture of the finished enamel by means of a simple mixing operation, according to the following formula:

| | Per cent |
|---|---|
| Intermediate product | 44.0 |
| Synthetic resin * | 27.4 |
| Mineral spirits | 15.4 |
| Hydrogenated naphtha (135–190° C.) | 7.0 |
| Toluene | 3.2 |
| Hi-flash naphtha | 3.0 |
| | 100.0 |

*Composition and preparation of this resin are the same as described above.

EXAMPLE II

Black enamel

Resin base solutions "A" and "B" are prepared by mixing the resins with suitable solvents in the proportions indicated as follows:

Resin solution "A"—

| | Per cent |
|---|---|
| Synthetic resin * | 41.2 |
| Mineral spirits | 26.3 |
| Heavy petroleum naphtha (185–215° C.) | 25.0 |
| Hydrogenated naphtha (high in aromatic hydrocarbons—boiling range 135–190° C.) | 7.5 |
| | 100.0 |

*Reaction product of 48 parts of glyceryl triphthalate, and 52 parts of linseed oil.

Resin solution "B"—

| | Per cent |
|---|---|
| Synthetic resin * | 45.0 |
| Mineral spirits | 30.0 |
| Hydrogenated naphtha (high in aromatic hydrocarbons—boiling range 135–190° C.) | 25.0 |
| | 100.0 |

*Reaction product of 51.7 parts of glyceryl triphthalate, 34.5 parts of soya bean oil, and 13.8 parts of China-wood oil.

27.5 parts of resin solution "A" are placed in a suitable masticating or kneading machine and 17.5 parts of carbon black are added gradually while the machine is working the "base" solution. A dense putty-like mass is formed. This mixture is kneaded for approximately three hours. At the end of the kneading cycle a solution consisting of 30.0 parts of resin solution "B", 12.5 parts of hi-flash naphtha, and 12.5 parts of mineral spirits is added to facilitate removal of the charge from the machine.

This intermediate product may then be utilized in the manufacture of commercial enamels by the addition of other constituents such as resins, plasticizers, solvents, etc., followed by a simple mixing operation following in general the procedure outlined for Example I.

EXAMPLE III

Yellow enamel

A resin base solution is prepared by mixing the resin with suitable solvents in the proportions indicated as follows:

| | Per cent |
|---|---|
| Synthetic resin * | 55.0 |
| Mineral spirits | 35.0 |
| Hydrogenated naphtha (high in aromatic hydrocarbons—boiling range 135–190° C.) | 10.0 |
| | 100.0 |

*Reaction product of 48 parts of glyceryl triphthalate, and 52 parts of linseed oil.

19.2 parts of the resin solution are placed in the kneading machine and 32.7 parts of Hansa yellow pigment are added gradually while the machine is working the "base" solution. A thick putty-like mass of high consistency is formed. This mixture is kneaded for approximately three hours. At the end of the kneading cycle an additional quantity of 48.1 parts of the resin solution is added to aid in removing the charge from the machine.

This intermediate product may then be conveniently utilized in the manufacture of commercial enamels by the addition of other ingredients such as resins, plasticizers, solvents, etc., followed by a simple mixing operation well known in the art following in general the procedure outlined for Example I.

In thinning the intermediate formed in the kneading machine the additional solvent added is either a suitable solvent used alone or the thin resin base solution containing such solvent. Thus while I prefer, as indicated in the above examples, to remove the charge from the mixer by the addition of resin solution, I may, but with considerable less advantage, use the solvent alone for this purpose although in this case care must be exercised in adding the solvent to avoid the formation of lumps which are broken up with difficulty.

The time required for suitable dispersion of the pigment will vary within rather wide limits, depending upon the consistency of the dispersing vehicle, the particular pigment used, the efficiency of the kneading apparatus, etc. In general, however, it is possible to satisfactorily disperse most pigments in a period of one-half to three hours. In some cases dispersion may be secured with even as short a kneading period as five minutes.

The degree or completeness of dispersion varies with the type of pigment employed. Pigments which are inherently hard are, of course, more difficult to disperse. The majority of the available pigments when dispersed according to the present invention provide enamel compositions which afford satisfactory finishes without further treatment. In certain cases it may be necessary to use some common means of filtration to remove any agglomerates which are not broken up by the kneading action of the mixer. The following constitute some of the pigments which have been effectively dispersed: lithopone and other sulphide pigments; Titanox and other titanium oxide pigments; Timonox and other antimony oxide pigments; titanate pigments such as barium, lead, and zinc titanates; lakes (maroon, black, etc.), ultramarine blue, iron blues (Prussian, Milori, Chinese blues), chrome yellow, chrome orange, chrome green, iron oxide, zinc oxide, ochre, burnt umber, bone black, lamp black, and carbon black.

The resins employed may be any one of the various resinous materials utilized in enamel compositions, such as the glycerol-phthalic anhydride-fatty acid type, the urea-formaldehyde type, or resins of the phenol-formaldehyde type. Also, natural resins, such as rosin, or modified natural resins, such as the ester gums, may be employed. It is understood that these types of resins are not intended to be exclusive, but are cited merely to indicate that all types of resins that are adapted to be used in film-forming compounds may be employed in the process of this invention.

Although the final intermediate produced in accordance with the foregoing examples is a soft paste and the resin vehicle itself is relatively thin, the consistency built up by the addition of the pigment to the resin solution is high enough to obtain the desired kneading action.

Since a relatively thin vehicle is used in the practice of this invention a substantial amount of solvent must accompany the charge in the mixer. The amount of solvent in each instance, however, is subject to considerable variation depending upon several factors, the most important of which is the oil absorption characteristic of the pigment being dispersed. Usually the solvent is not used in amount less than 25% of the weight of resin nor more than 4 parts by weight of solvent for one part by weight of resin.

An important part of the process is the selection of the ratio of pigment to vehicle to be used. This ratio should be so selected that the plastic mass will absorb as much energy as possible from the blades of the kneading machine. If the ratio of pigment to vehicle be too great, the mass will be crumbly and non-coherent, and the blades of the mixer will pass through it without transferring energy to any useful extent. If, on the other hand, the ratio of pigment to vehicle be too low, the consistency of the plastic is of such a low order that only small amounts of energy will be transferred.

The optimum consistency is that consistency at which the mass absorbs the greatest amount of energy. The more energy absorbed, the quicker the dispersion and the shorter the cycle of operation. The operative limits of actual consistency vary widely with the different pigments and vehicles. The best operating conditions lie between a consistency where the mass will just flow under its own weight and that point where the mass is so resistant to change of form that prolonged heavy pressure with the thumb will just make an impression. In general, it is preferred to operate at or near the upper limit of consistency.

The ratio of pigment to the resin solution will as a rule vary from pigment in amount of about 7% to 300% by weight of the resin solution.

The frictional heat developed during the kneading action in the present process is not sufficiently high to have adverse effects on the pigments as is the case when some molten resins are used which in many instances develop high frictional temperatures and which in some instances require a high temperature in order to maintain them in a molten condition during the process. Although such excessive temperatures are not developed by the process described herein, it is desirable in order to operate the process at maximum efficiency to maintain the temperature during the mixing below 80° C. and preferably between 60 and 70° C. These temperatures are below those which are frequently required for dispersing pigments with a molten resin.

The present invention provides for an intermediate product in the manufacture of coating compositions which reduces pigment caking tendencies, and which may be stored for extended periods until convenient to convert to the finished enamel. The finished product prepared is characterized by improved gloss and by extraordinary clarity of color, indicating that improved dispersion has been secured. The dark enamels, such as the carbon black, appear denser, and the light ones take on a cleaner and brighter finish. The product of the present invention is also free of the contamination which is present in products made by methods using mechanical disintegration and attrition and which is caused by the abrasion of machine surfaces. The method claimed herein is economical in practice because the cycle of operation and the man hours of labor are greatly decreased as compared to the prior processes in which the pigment agglomerates are broken up by mechanical attrition grinding or rubbing.

In addition to the above mentioned advantages possessed over the methods of pigment dispersion utilizing mechanical disintegration and attrition, my new process has valuable advantages which cannot be obtained when the pigment is kneaded with a stiffly plastic resin and reliance is had upon relatively high temperature to maintain the plasticity of the resin during the kneading. My new process may be operated without adverse effect on the color characteristic of those pigments sensitive to heat. Furthermore, I may use resins, such as those of the drying oil types, having a decided tendency toward oxidation without any danger of such oxidation or polymerization toward the end of the kneading cycle. In the present process, therefore, there is no danger of obtaining, as is the case when the pigment and molten resin are kneaded an intermediate product in which the resin is insoluble in the customary solvents.

The present invention, in which a relatively thin resin solution is used and in which the consistency required for efficient kneading is obtained through the quantity of pigment, also presents an economy of operation and ease of handling that cannot be had by using resins which cool to a solid mass or to a highly viscous, non-flowing condition. The dispersion of the resin in a solvent according to the practice of this invention facilitates both the transfer of the resin from the shipping container to the mixer, and of the pigment-resin intermediate from the mixer. This advantage is of particular merit with high-melting point resins because the use of these resins in a molten state would require heating of the container to transfer the resin to the mixer. The considerable losses of material in transferring either a molten resin, or a resin which barely flows without heating, to the mixer and in removing the resin-pigment mixture from the mixer are also avoided by my process.

Although some types of resins when cooled to a solid mass do not cause the pigment-resin mixture to adhere to the walls of the mixer to an extent which prevents removal by the more or less unsatisfactory practice of breaking the mass to small pieces, there are many types of resins which adhere more tenaciously and require removal in the molten condition. The last mentioned type of resin includes particularly the oil modified resins which are not brittle at room temperature and which, if the practice of using the resin solution according to the present invention were not followed, would require removal from the mixer in the molten state with resultant excessive losses.

An important advantage of my new pigment dispersion process is that less resin is required for any given quantity of pigment. This advantage is illustrated by Example II above and is of particular merit when the final composition is based on a resin which is not a good dispersion vehicle. Thus the solution type dispersion described herein permits the use of a small amount of a different resin which exhibits good dispersing properties for use in the first stage of the process, but which, because it is present in relatively small quantities in the final composition, does not appreciably alter the properties provided by the particular resin which exhibits poor dispersing properties but which confers other desirable features to the ultimate composition.

As many apparently widely different embodiments of this invention may be made without departing from the spirit and scope thereof, it is to be understood that I do not limit myself to the specific embodiments thereof except as defined in the appended claims.

I claim:

1. A process for manufacturing a pigment intermediate for use in coating compositions which comprises kneading a mass consisting essentially of a resin, a substantial amount of solvent to form a relatively thin resinous vehicle, and pigment in amount to produce a stiff plastic mass of consistency which permits efficient dispersion of the pigment in the mass through kneading action, continuing the kneading until the pigment is uniformly dispersed throughout the resinous vehicle, adding additional resin solution to facilitate removal of the charge and thereby obtain the pigment intermediate in the form of a freely flowing paste.

2. In the manufacture of coating compositions the steps which comprise kneading a mass consisting essentially of a resin, a substantial amount of solvent to form a relatively thin resinous vehicle, and pigment in amount to produce a stiff plastic mass of consistency which permits efficient dispersion of the pigment in the mass through kneading action, continuing the kneading until an intermediate containing finely divided pigment uniformly dispersed throughout the resinous vehicle is obtained, and thinning the product thus obtained with additional solvent.

3. A process for manufacturing a pigment intermediate for use in coating compositions which comprises kneading a mass consisting essentially of a resin, a substantial amount of solvent to form a relatively thin resinous vehicle, and pigment in amount to produce a stiff plastic mass of consistency which permits efficient dispersion of the pigment in the mass through kneading action, maintaining the temperature during the kneading below 80° C., continuing the kneading until an intermediate containing finely divided pigment uniformly dispersed throughout the resinous vehicle is obtained, and thinning the product thus obtained with additional solvent.

4. The process set forth in claim 1 in which the resin is a polyhydric alcohol-polybasic acid resin.

5. The process set forth in claim 1 in which the solvent in the thin resinous vehicle is present in amount from 25% to four times the weight of the resin, and in which the pigment is present in amount of about 7% to 300% by weight of pigment for each part by weight of the resin solution.

ROBERT TYLER HUCKS.